US012058981B2

(12) United States Patent
Yang et al.

(10) Patent No.: US 12,058,981 B2
(45) Date of Patent: Aug. 13, 2024

(54) FEED-SUPPLYING SYSTEM

(71) Applicant: National Pingtung University of Science and Technology, Neipu Township (TW)

(72) Inventors: Cheng-Huei Yang, Neipu Township (TW); Chang-Hsien Tai, Pingtung County (TW); Perng-Chih Shen, Neipu Township (TW)

(73) Assignee: NATIONAL PINGTUNG UNIVERSITY OF SCIENCE AND TECHNOLOGY, Neipu Township (TW)

( * ) Notice: Subject to any disclaimer, the term of this patent is extended or adjusted under 35 U.S.C. 154(b) by 188 days.

(21) Appl. No.: 17/471,004

(22) Filed: Sep. 9, 2021

(65) Prior Publication Data
US 2023/0074540 A1    Mar. 9, 2023

(51) Int. Cl.
*A01K 5/02* (2006.01)

(52) U.S. Cl.
CPC ................. *A01K 5/0283* (2013.01)

(58) Field of Classification Search
CPC .. A01K 5/0283; A01K 5/0275; A01K 5/0291; A01K 5/02; A01K 5/0114; A01K 5/01; A01K 5/0266; A01K 39/012; A01K 39/04
USPC ..................................................... 119/51.11
See application file for complete search history.

(56) References Cited

U.S. PATENT DOCUMENTS

| | | | | |
|---|---|---|---|---|
| 5,782,201 | A | * | 7/1998 | Wells ...................... A01K 5/02 119/57.4 |
| 5,899,367 | A | * | 5/1999 | Strength .................. A01K 5/02 222/61 |
| 8,387,566 | B2 | * | 3/2013 | Graves ................... A01K 7/005 119/51.01 |
| 9,522,811 | B2 | * | 12/2016 | Van Kuilenburg ..... B66C 13/18 |
| 2013/0305994 | A1 | * | 11/2013 | Dubinsky ............ A01K 5/0291 119/51.11 |
| 2014/0060441 | A1 | * | 3/2014 | Baxter ................. A01K 5/0275 119/61.5 |
| 2014/0267705 | A1 | * | 9/2014 | Hankins ................... A01K 5/02 119/51.01 |

(Continued)

FOREIGN PATENT DOCUMENTS

CN          108990823 A  * 12/2018    ............. A01K 5/004

OTHER PUBLICATIONS

CN-108990823-A_Machine Translation (Year: 2018).*

*Primary Examiner* — David J Parsley
*Assistant Examiner* — Sahar Almatrahi
(74) *Attorney, Agent, or Firm* — Lewis Roca Rothgerber Christie LLP

(57) ABSTRACT

A feed-supplying system includes a feeder and a scale. The feeder includes a bin, a valve module and a monitoring module. The monitoring module controls the valve module to open an outlet of the bin to allow the feeder to supply feed, measures a vertical inside-bin distance, and outputs a notification when it is determined that an amount of stored feed is less than a threshold based on the distance. The scale supports the supplied feed, senses weight of a load thereon. When it is determined that an amount of the supplied feed has reached a threshold based on the weight, the monitoring module controls the valve module to close the outlet so as to stop the supply of the feed.

16 Claims, 5 Drawing Sheets

(56) References Cited

U.S. PATENT DOCUMENTS

| | | | |
|---|---|---|---|
| 2016/0029592 A1* | 2/2016 | Springer | G08C 17/02 |
| | | | 119/51.11 |
| 2016/0286755 A1* | 10/2016 | Feng | A01K 5/0283 |
| 2017/0055493 A1* | 3/2017 | Bachman | B01F 33/502 |
| 2017/0208780 A1* | 7/2017 | Collins | A01K 53/00 |
| 2018/0300662 A1* | 10/2018 | Lauve, IV | G06Q 10/1097 |

\* cited by examiner

FEED-SUPPLYING SYSTEM

FIELD

The disclosure relates to a feed-supplying system, and more particularly to a feed-supplying system capable of monitoring feed storage and feed supply.

BACKGROUND

Conventionally, management of feed supply is carried out by labor. Particularly, determining an amount of feed stored in a feed bin, determining when to open an outlet of the feed bin to allow the feeder to supply feed or close the outlet to stop the supply of the feed, opening or closing the outlet, and determining an amount of feed thus supplied all greatly involve human decisions and manual operations, resulting in high labor costs and low efficiency.

SUMMARY

Therefore, an object of the disclosure is to provide a feed-supplying system that can alleviate at least one of the drawbacks of the prior art.

According to the disclosure, the feed-supplying system includes a feeder and a weighing scale.

The feeder includes a feed bin, a valve module and a monitoring module. The feed bin has a storage space for storing feed, and an outlet in spatial communication with the storage space. The valve module is mounted on the feed bin and adjacent to the outlet, and is configured to open and close the outlet. The monitoring module is mounted on a top of the feed bin, and includes a feed-surface detector and a first microcontroller. The feed-surface detector is configured to measure an inside-bin distance between the feed-surface detector and a surface inside the feed bin in a vertical direction, and to output a result of measurement of the inside-bin distance. The first microcontroller is electrically connected to the valve module and the feed-surface detector. The first microcontroller is configured to control the valve module to open the outlet to allow the feeder to supply the feed stored in the feed bin, to communicate with the feed-surface detector to obtain the result of measurement of the inside-bin distance, to determine whether an amount of the feed currently stored in the feed bin is less than a predetermined shortage threshold based on the result of measurement of the inside-bin distance, and to output a shortage notification when it is determined that the amount of the feed currently stored in the feed bin is less than the predetermined shortage threshold.

The weighing scale includes a platform, a weight sensor and a second microcontroller. The platform is configured to support the feed supplied from the feed bin. The weight sensor is mounted on the platform, and is configured to sense weight of a load on the platform and to output weight information indicating the weight of the load on the platform. The second microcontroller is electrically connected to the weight sensor to obtain the weight information. The second microcontroller is configured to communicate with the first microcontroller, and to cooperate with the first microcontroller to implement one of a first stop-supplying procedure and a second stop-supplying procedure.

In the first stop-supplying procedure, the second microcontroller is configured to determine whether an amount of the feed supplied from the feed bin has reached a predetermined supply threshold based on the weight information, and to output a stop signal to the first microcontroller when it is determined that the amount of the feed supplied from the feed bin has reached the predetermined supply threshold. In response to receipt of the stop signal from the second microcontroller, the first microcontroller controls the valve module to close the outlet so as to stop the supply of the feed.

In the second stop-supplying procedure, the second microcontroller is configured to output the weight information to the first microcontroller. The first microcontroller is configured to determine whether an amount of the feed supplied from the feed bin has reached the predetermined supply threshold based on the weight information, and to control the valve module to close the outlet so as to stop the supply of the feed when it is determined that the amount of the feed supplied from the feed bin has reached the predetermined supply threshold.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
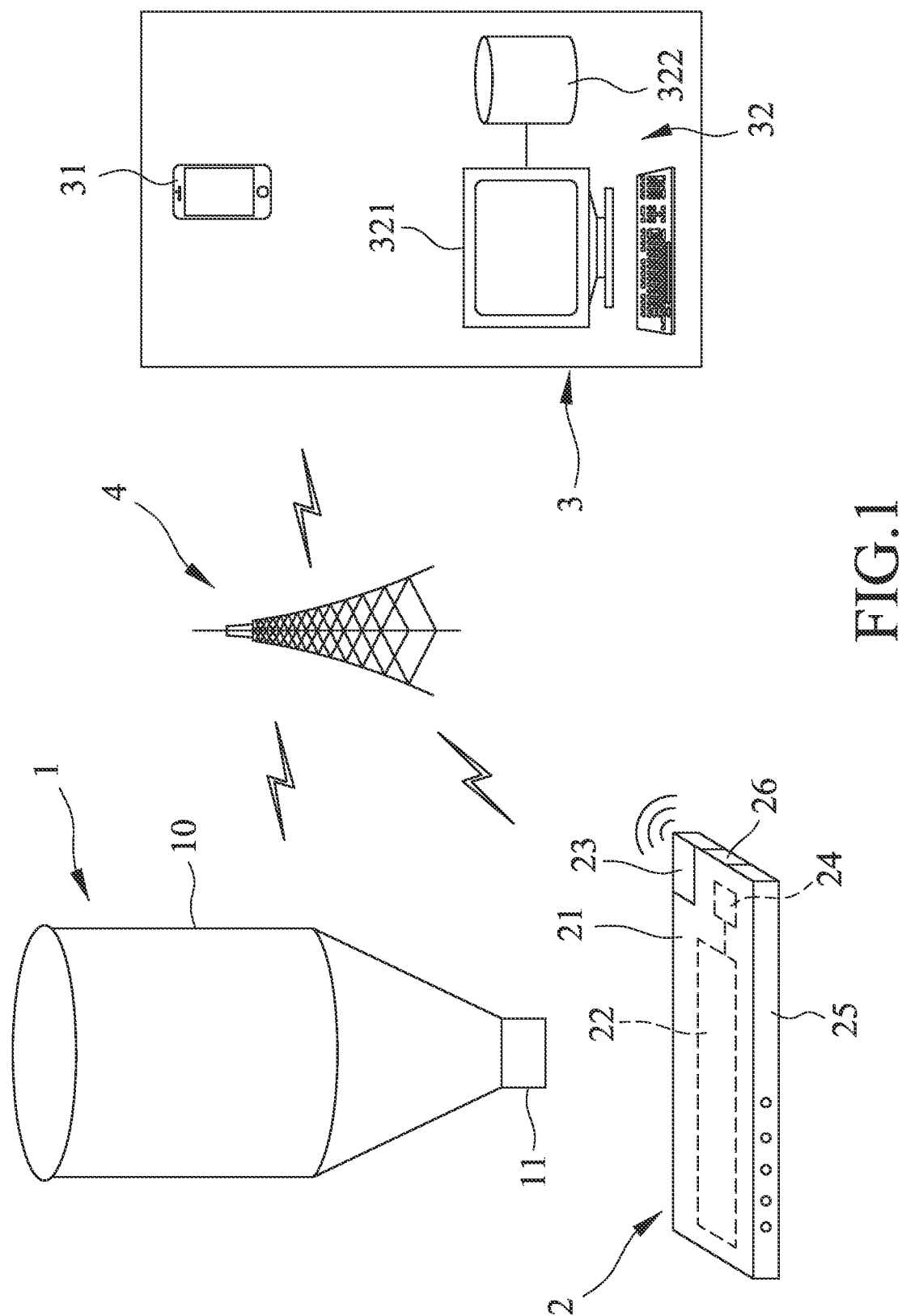
FIG. 1 is a schematic diagram illustrating an example of a feed-supplying system according to an embodiment of the disclosure.

Referring to FIG. 1, an embodiment of a feed-supplying system according to the disclosure is illustrated. The feed-supplying system may be, for example, installed in a farm, and includes a feeder 1, a weighing scale 2 and a remote monitoring device 3. It is worth to note that the number of the feeder 1 is equal to the number of the weighing scale 2. In other embodiments, the feed-supplying system may include a plurality of the feeders l and a plurality of the weighing scales 2 based on practical needs and conditions, such as space of the farm and a scale of livestock farming in the farm.

In this embodiment, the feeder 1, the weighing scale 2 and the remote monitoring device 3 are capable of communicating with each other by using wireless technologies. Optionally, as shown in FIG. 1, a base station 4 dedicated for the feed-supplying system is adopted so as to ensure stability of the aforesaid wireless communication among the feeder 1, the weighing scale 2 and the remote monitoring device 3. However, implementation of communication utilized by the feed-supplying system is not limited to the disclosure herein and may vary in other embodiments. For example, in some embodiments, the feeder 1, the weighing scale 2 and the remote monitoring device 3 may be configured to communicate with each other through a wireless network (e.g., the Internet, the Internet of Things, a cellular network, etc.).

In one embodiment, the remote monitoring device 3 is implemented to be a portable device 31 such as a smartphone, enhancing convenience of carrying the remote monitoring device 3.

In one embodiment, the remote monitoring device 3 is implemented to be a server 32. The server 32 includes a database storage 322, and a host 321 including a display.

The server 32 is configured to present, via the host 321, data collected from the feeder 1 and the weighing scale 2, and to store the data in the database storage 322 for future use.

Figure 2:
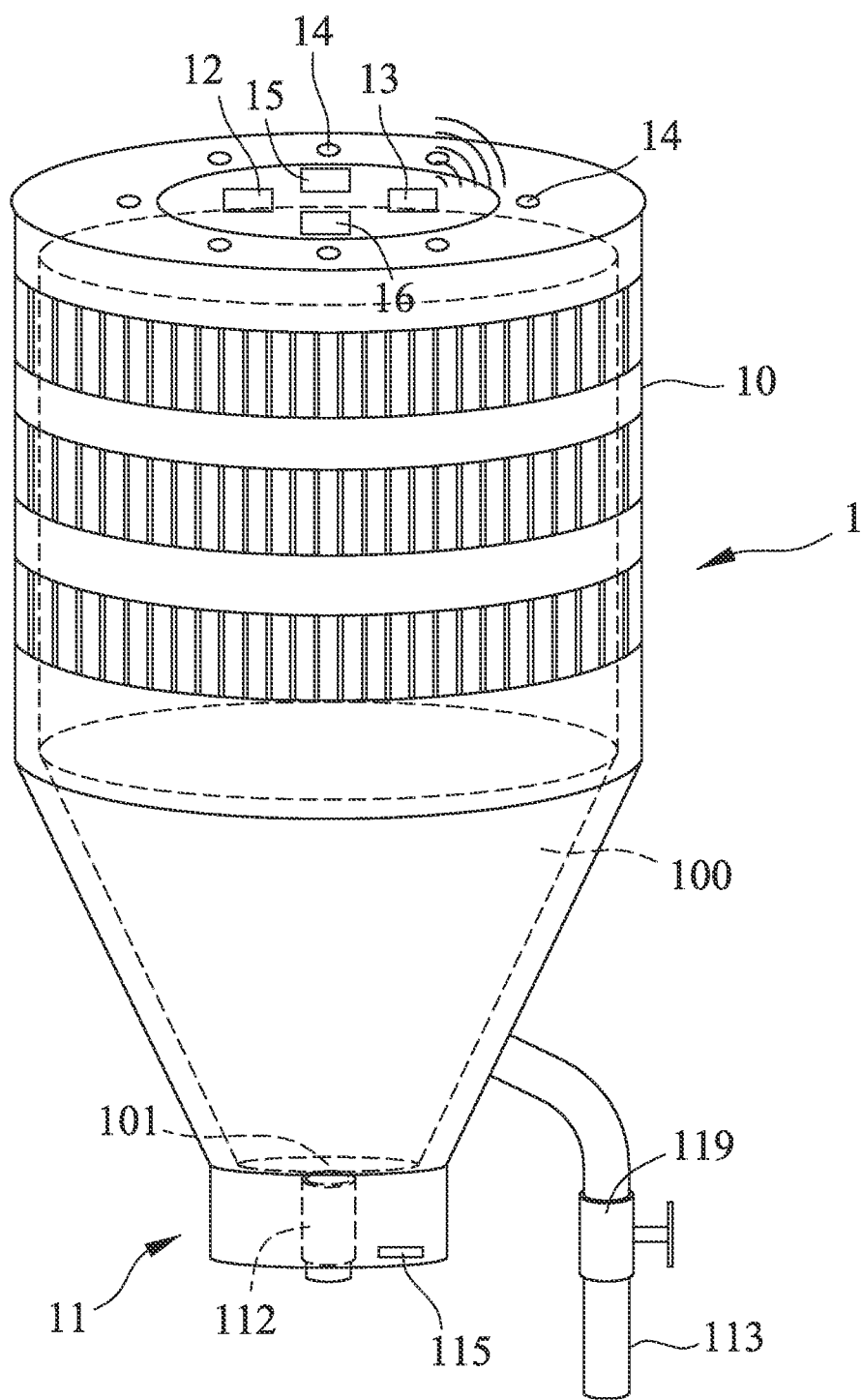
FIG. 2 is a schematic diagram illustrating an example of a feeder of the feed-supplying system according to an embodiment of the disclosure.
Figure 3:
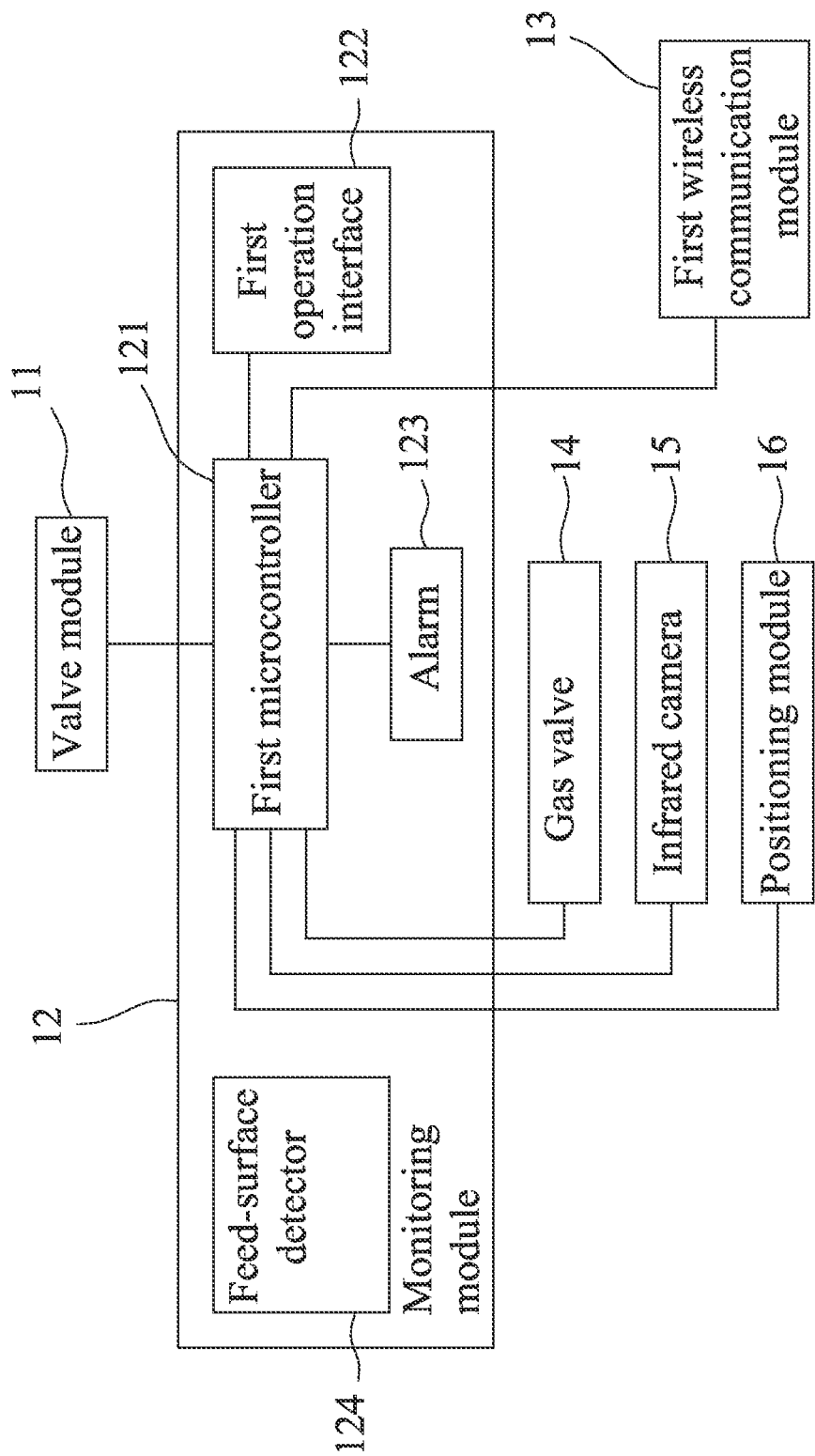
FIG. 3 is a block diagram of the feeder according to an embodiment of the disclosure.

Referring to FIGS. 1 to 3, the feeder 1 includes a feed bin 10, a valve module 11, a monitoring module 12, a first wireless communication module 13, a plurality of gas valves 14, an infrared camera 15 and a positioning module 16.

As shown in FIG. 2, the feed bin 10 has a storage space 100 for storing feed, and has an outlet 101 in spatial communication with the storage space 100. In particular, the feed bin 10 has an inner surface that is represented by dashed lines and that defines the storage space 100. The monitoring module 12, the first wireless communication module 13, the gas valves 14, the infrared camera 15 and the positioning module 16 are mounted on a top of the feed bin 10. The valve module 11 is mounted on the feed bin 10 and adjacent to the outlet 101, and is configured to open and close the outlet 101.

In this embodiment, the first wireless communication module 13 is implemented to be a wireless transceiver that supports wireless communication standards, such as Bluetooth® technology standards, Wi-Fi technology standards and/or cellular network technology standards, but is not limited thereto. In some embodiments, the first communication module 13 may include a mobile communication module supporting telecommunication using Long-Term Evolution (LTE), the third generation (3G) and/or fifth generation (5G) of wireless mobile telecommunications technology, and/or the like.

Roughly speaking, the monitoring module 12 is configured to automatically and continuously monitor conditions related to feed storage and feed supply. Referring to FIG. 3, the monitoring module 12 includes a first microcontroller 121, and a first operation interface 122, an alarm 123 and a feed-surface detector 124 that are electrically connected to the first microcontroller 121. The first microcontroller 121 is electrically connected to the valve module 11, the first wireless communication module 13, the gas valves 14, the infrared camera 15 and the positioning module 16. It is worth to note that the aforementioned components of the monitoring module 12 are modularized and integrated into a single hardware component, facilitating installation of the monitoring module 12 on the top of the feed bin 10.

The first microcontroller 121 may be implemented by a central processing unit (CPU), a micro control unit (MCU), a system on a chip (SoC), or any circuit configurable/programmable in a software manner and/or hardware manner to implement functionalities discussed in this disclosure.

The first operation interface 122 is configured to be operated to set parameters to be referred to by the first microcontroller 121 for controlling operation of the monitoring module 12. The parameters exemplarily include parameters used in monitoring the feed storage (e.g., a predetermined storage threshold). The first operation interface 122 is further configured to output data (e.g., displaying the data detected by the feed-surface detector 124), and to be operated to input data and to reset the feed-supplying system. In this embodiment, the first operation interface 122 may be implemented by a dual in-line package (DIP) switch, a physical push button or a virtual button displayed on a touchscreen, but is not limited thereto. It is worth to note that in one embodiment, the parameters are set by using the remote monitoring device 3, and then transmitted by the remote monitoring device 3 to the feeder 1 so as to enable the feeder 1 to refer to the parameters thus set.

The first microcontroller 121 is configured to control the valve module 11 to open the outlet 101 to allow the feeder 1 to supply the feed stored in the feed bin 10, and to close the outlet 101 to stop supplying the feed. Specifically, the valve module 11 includes an electric control valve 112 that is electrically connected to the first microcontroller 121, and that is mounted at the outlet 101. The first microcontroller 121 is configured to control the electric control valve 112 to switch between an open state where the outlet 101 is open for allowing the feed stored in the storage space 100 to be released, and a closed state where the outlet 101 is closed for disallowing the feed stored in the storage space 100 to be released. That is to say, the electric control valve 112 opens the outlet 101 to allow supply of the feed, and closes the outlet 101 to stop the supply of the feed.

It is worth to note that the valve module 11 further includes a bypass pipe 113 and a manual control valve 119. The bypass pipe 113 has another outlet different from the outlet 101, and is in spatial communication with the storage space 100. The manual control valve 119 is mounted on the bypass pipe 113, is normally closed to forbid the feed to be outputted through the bypass pipe 113, and is configured to be manually controlled to open the bypass pipe 113 for allowing the feed stored in the storage space 100 to be outputted through the bypass pipe 113. For example, in an unexpected situation (e.g., when the electric control valve 112 malfunctions or is under maintenance), a user can manually operate the manual control valve 119 to open the bypass pipe 113 so as to allow the feeder 1 to supply the feed through the bypass pipe 113.

The valve module 11 further includes a distance detector 115 that is electrically connected to the first microcontroller 121. The distance detector 115 is mounted adjacent to the outlet 101 of the feed bin 10. The distance detector 115 is configured to measure an outside-bin distance between the distance detector 115 and an object outside the feed bin 10 in a vertical direction, and to output a result of measurement of the outside-bin distance to the first microcontroller 121. The distance detector 115 may be implemented by an ultrasonic distance sensor or an optical distance sensor, but is not limited thereto.

The feed-surface detector 124 is configured to measure an inside-bin distance between the feed-surface detector 124 and a surface inside the feed bin 10 in the vertical direction, and to output a result of measurement of the inside-bin distance. It should be noted that the surface inside the feed bin 10 may be the surface (level) of the feed stored in the feed bin 10 (also known as "feed surface"); that is to say, the feed-surface detector 124 is configured to measure a distance between the top of the feed bin 10 where the monitoring module 12 is mounted and the surface of the feed stored in the feed bin 10. The feed-surface detector 124 may be implemented by an ultrasonic distance sensor or an optical distance sensor, but is not limited thereto.

The first microcontroller 121 is configured to communicate with the feed-surface detector 124 to obtain the result of measurement of the inside-bin distance, to determine whether an amount of the feed currently stored in the feed bin 10 is less than a predetermined shortage threshold based on the result of measurement of the inside-bin distance, and to output a shortage notification when it is determined that the amount of the feed currently stored in the feed bin 10 is less than the predetermined shortage threshold. Additionally, the first microcontroller 121 is further configured to determine whether the amount of the feed currently stored in the feed bin 10 has reached a predetermined filled threshold based on the result of measurement of the inside-bin distance, and to output a filled notification when it is determined that the amount of the feed currently stored in the feed bin 10 has reached the predetermined filled threshold. It is worth to note that both the predetermined shortage threshold and the predetermined filled threshold can be set, for example, by a user operating the first operation interface 122.

In one embodiment, the first microcontroller 121 is configured to determine a volume of the feed currently stored in the feed bin 10 by subtracting a product of the result of measurement of the inside-bin distance and a cross-sectional area of the storage space 100 of the feed bin 10 from a total volume of the feed bin 10, and to make the volume of the feed currently stored in the feed bin 10 serve as the amount of the feed currently stored in the feed bin 10. In this embodiment, the predetermined shortage threshold is a value in terms of volume. The cross-sectional area of the storage space 100 of the feed bin 10 and the total volume of the feed bin 10 can also be set by operating the first operation interface 122.

In one embodiment, the first microcontroller 121 is configured to determine an unoccupied ratio that is a ratio of the result of measurement of the inside-bin distance to a height of the storage space 100 of the feed bin 10, to determine an occupied ratio by subtracting the unoccupied ratio from one, and to make the occupied ratio serve as the amount of the feed currently stored in the feed bin 10. In this embodiment, the predetermined shortage threshold is a percentage (e.g., 10%). The height of the storage space 100 of the feed bin 10 can also be set by operating the first operation interface 122.

Moreover, the first microcontroller 121 is further configured to output the shortage notification by controlling the alarm 123 to output a shortage alarm signal when it is determined that the amount of the feed currently stored in the feed bin 10 is less than the predetermined shortage threshold, and to output the filled notification by controlling the alarm 123 to output a filled alarm signal when it is determined that the amount of the feed currently stored in the feed bin 10 has reached the predetermined filled threshold. In one embodiment, the alarm 123 is a speaker that outputs sounds serving as the alarm signals. In one embodiment, the alarm 123 is a lighting device (e.g., light-emitting diode (LED)) that emits light serving as the alarm signals.

In some embodiments, the first microcontroller 121 is configured to output the shortage notification and the filled notification to the remote monitoring device 3 via the first wireless communication module 13 for the remote monitoring device 3 to present the shortage notification and the filled notification. In this way, the user of the feed-supplying system may be notified by the remote monitoring device 3, and may be able to react (e.g., to check the amount of the feed currently stored in the feed bin 10) to the shortage notification and the filled notification in time.

The gas valves 14 are configured to be controlled to switch between an open state for allowing gas to flow from a high pressure gas source (not shown) into the feed bin 10, and a closed state for disallowing the gas to flow from the high pressure gas source into the feed bin 10. The gas valves 14 may be automatically controlled by the first microcontroller 121, or controlled by the user operating the first operation interface 122.

The infrared camera 15 is configured to capture a real-time image of the storage space 100 of the feed bin 10 and to transmit the real-time image to the first microcontroller 121. The first microcontroller 121 is further configured to determine whether there is an attached object (e.g., a small piece of the feed) attached to the inner surface of the feed bin 10 at a position higher than the feed surface based on the real-time image, and to switch the gas valves 14 to the open state to inject gas into the feed bin 10 to allow gas to flow toward the inner surface of the feed bin 10 for cleaning the inner surface of the feed bin 10 (for clearing the inner surface of the feed bin 10 of things clinging thereto) when it is determined that there is an object attached to the inner surface of the feed bin 10. It should be noted that things attaching or clinging to the inner surface of the feed bin 10 may affect accuracy of estimation of the amount of the feed stored in the feed bin 10 since the attached object instead of the feed surface may be detected by the feed-surface detector 124 so the result of measurement of the inside-bin distance outputted by the feed-surface detector 124 would be a distance between the feed-surface detector 124 and the attached object, rather than between the feed-surface detector 124 and the surface of the feed stored in the feed bin 10. Therefore, by virtue of the gas valves 14 and the infrared camera 15, the piece of the feed attached to the inner surface of the feed bin 10 at a position higher than the feed surface can be detached from the inner surface, and the amount of the feed stored in the feed bin 10 may be accurately estimated. It should be noted that implementation of determining whether there is an object attached to the inner surface of the feed bin 10 can be realized by using well-known image recognition techniques.

In some embodiments, the infrared camera 15 is configured to transmit the real-time image to the remote monitoring device 3 for the remote monitoring device 3 to present the real-time image. Specifically, the infrared camera 15 is configured to transmit the real-time image to the first microcontroller 121, and the first microcontroller 121 is configured to then transmit the real-time image to the remote monitoring device 3 via the first wireless communication module 13. As a result, the user of the feed-supplying system may have an alternative approach of monitoring conditions related to feed storage and feed supply, and may be able to maintain the feed storage and feed supply at desirable conditions, or to respond to any unexpected situation in time.

The positioning module 16 is configured to obtain location information related to a current location of the feeder 1 and to transmit the location information to the remote monitoring device 3 for the remote monitoring device 3 to present the location information. Specifically, the positioning module 16 transmits the location information to the first microcontroller 121, and then the first microcontroller 121 transmits the location information to the remote monitoring device 3 via the first wireless communication module 13. In this embodiment, the positioning module 16 is implemented by a GPS (global positioning system) receiver so as to receive a GPS positioning signal from a GPS satellite for determining a position of the positioning module 16 mounted on the feeder 1 (i.e., the current location of the feeder 1).

In a large farm where a plurality of the feeders 1 are used, for each of the plurality of the feeders 1, the remote monitoring device 3 is capable of presenting, in a graphical user interface (GUI) based on the location information transmitted by the positioning module 16 mounted on the feeder 1, a location of the feeder 1 on a digital map by an icon representing the feeder 1. When it is determined that the icon is selected based on user operation (e.g., the icon is clicked by a user), the remote monitoring device 3 is configured to present graphical information related to conditions of feed storage and feed supply (e.g., the real-time image and the amount of the feed currently stored in the feeder 1) to facilitate effective and efficient conveying of information related to conditions of feed storage and supply to the user.

Figure 4:
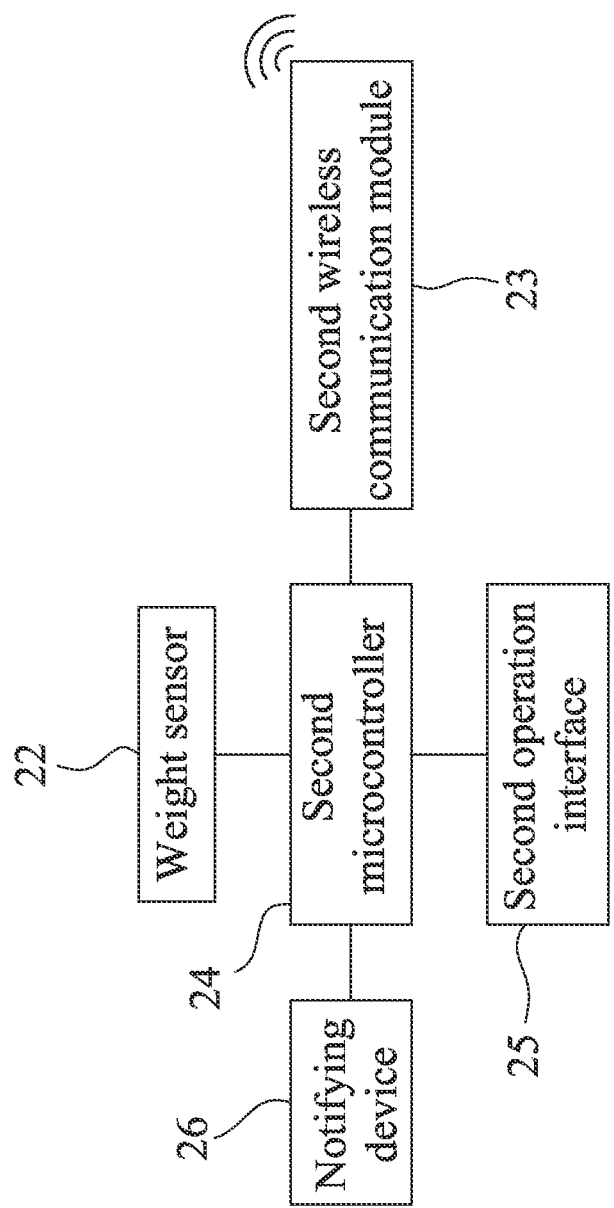
FIG. 4 is a block diagram of a weighing scale of the feed-supplying system according to an embodiment of the disclosure.

Referring to FIGS. 1 and 4, the weighing scale 2 includes a platform 21, a weight sensor 22, a second wireless communication module 23, a second microcontroller 24, a second operation interface 25 and a notifying device 26. The weight sensor 22, the second wireless communication module 23, the second microcontroller 24, the second operation interface 25 and the notifying device 26 are mounted to the platform 21 as shown in FIG. 1.

Referring to FIG. 4, the second microcontroller 24 is electrically connected to the weight sensor 22, the second wireless communication module 23, the second operation interface 25 and the notifying device 26.

The platform 21 is configured to support the feed supplied from the feed bin 10. Specifically, a movable carrier 8 (see FIG. 5) used to carry the feed supplied from the feed bin 10 may be moved to and supported by the platform 21.

The weight sensor 22 is configured to sense weight of a load on the platform 21 (i.e., the movable carrier 8 alone or the movable carrier 8 with the feed carried thereby), and to output weight information indicating the weight of the load on the platform 21. That is to say, the weight information contains a result of measurement of the weight of the load on the platform 21.

The second microcontroller 24 may be implemented by a central processing unit (CPU), a micro control unit (MCU), a system on a chip (SoC), or any circuit configurable/programmable in a software manner and/or hardware manner to implement functionalities discussed in this disclosure.

The second operation interface 25 may be implemented by a combination of a display and a plurality of physical operable buttons, or by a touchscreen that integrates functions of display and operation and that may enhance convenience of using the second operation interface 25. The second operation interface 25 is configured to be operated to set parameters to be referred to by the second microcontroller 24 for controlling operation of the weighing scale 2. The parameters exemplarily include a predetermined supply threshold that is related to an amount of the feed to be supplied from the feed bin 10, and are exemplarily related to weight measurement to be performed by the weight sensor 22 (e.g., precision of result of measurement). It is worth to note that in one embodiment, the parameters are set by using the remote monitoring device 3, and then transmitted by the remote monitoring device 3 to the weighing scale 2 so as to enable the weighing scale 2 to refer to the parameters thus set.

In this embodiment, the second wireless communication module 23 is implemented to be a wireless transceiver that supports wireless communication standards, such as Bluetooth® technology standards, Wi-Fi technology standards and/or cellular network technology standards, but is not limited thereto. In some embodiments, the second communication module 23 may include a mobile communication module supporting telecommunication using Long-Term Evolution (LTE), the third generation (3G) and/or fifth generation (5G) of wireless mobile telecommunications technology, and/or the like. The first microcontroller 121 and the second microcontroller 24 are configured to communicate with each other respectively via the first wireless communication module 13 and the second wireless communication module 23.

The second microcontroller 24 is electrically connected to the weight sensor 22 to obtain the weight information therefrom, and is configured to output the weight information to the remote monitoring device 3 via the second wireless communication module 23 for the remote monitoring device 3 to present the weight information.

Figure 5:
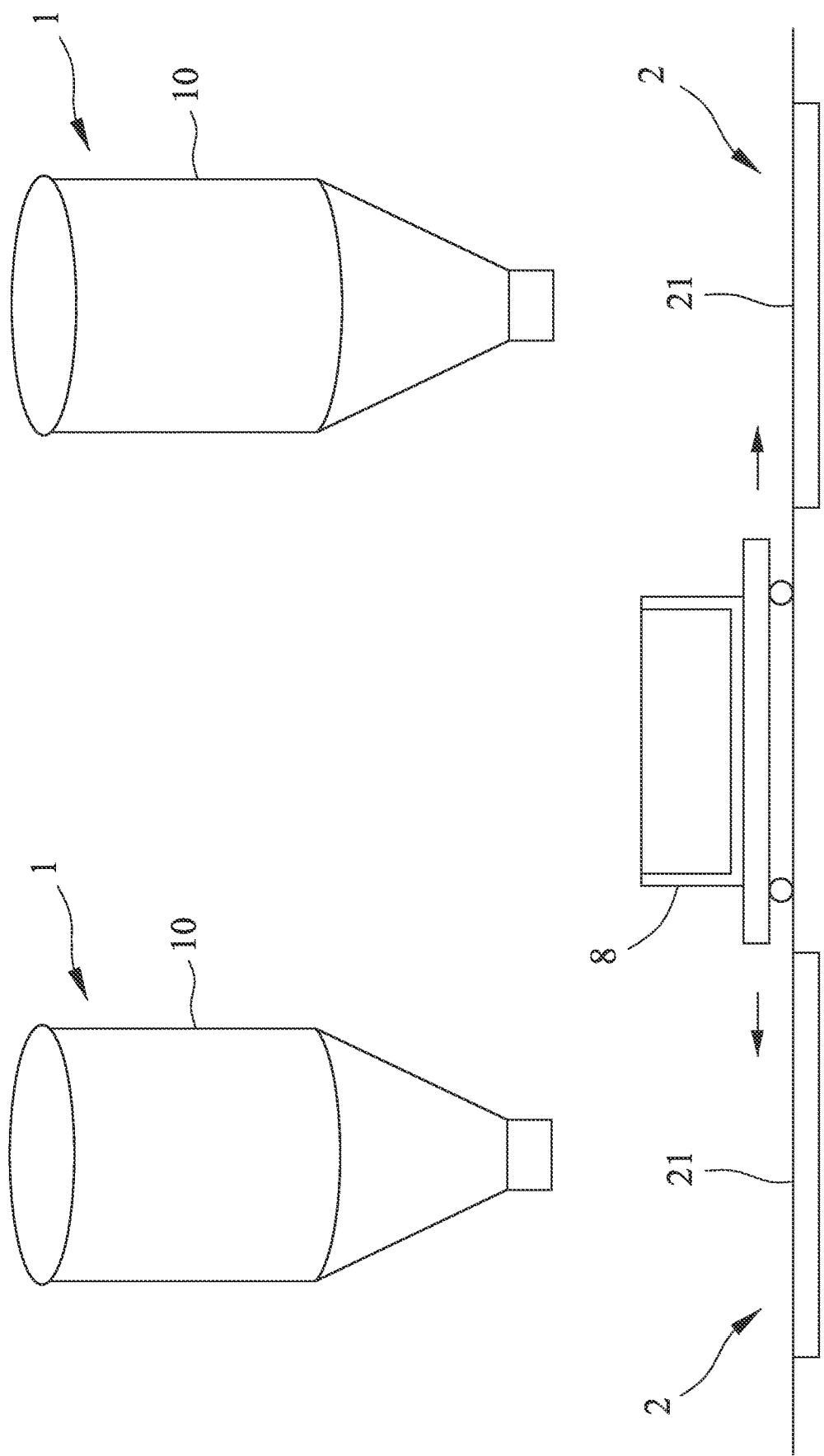
FIG. 5 is a schematic diagram illustrating an application example of the feed-supplying system according to an embodiment of the disclosure.

Further referring to FIG. 5, the movable carrier 8 may be manually driven or may automatically move to the platform 21 under one of the feed bins 10. For the sake of clear explanation, only one of the feed bins 10 is described as an example hereinafter.

The second microcontroller 24 is configured to determine whether the movable carrier 8 for carrying the feed supplied from the feed bin 10 is currently on the platform 21 under the feed bin 10 based on the weight information. For example, the second microcontroller 24 determines that the movable carrier 8 is currently on the platform 21 under the feed bin 10 and is able to receive the feed when the weight of the load on the platform 21 indicated by the weight information is substantially equal to a predetermined weight (i.e., the net weight of the movable carrier 8 itself). The predetermined weight can also be set by operating the second operation interface 25. The second microcontroller 24 is configured to communicate with the first microcontroller 121 via the second wireless communication module 23, and to output a start signal to the first microcontroller 121 when it is determined that the movable carrier 8 is currently on the platform 21 and is able to receive the feed. In response to receipt of the start signal from the second microcontroller 24, the first microcontroller 121 controls the valve module 11 to open the outlet 101 so as to start supply of the feed. Subsequently, the second microcontroller 24 is further configured to determine whether an amount of the feed supplied from the feed bin 10 has reached the predetermined supply threshold based on the weight information, and to output a stop signal to the first microcontroller 121 when it is determined that the amount of the feed supplied from the feed bin 10 has reached the predetermined supply threshold. The predetermined supply threshold is equal to a weight of the movable carrier 8 filled with feed. In response to receipt of the stop signal from the second microcontroller 24, the first microcontroller 121 controls the valve module 11 to close the outlet 101 so as to stop supply of the feed. At the same time, the second microcontroller 24 is configured to control the notifying device 26 to output a full-load notification when it is determined that the amount of the feed supplied from the feed bin 10 has reached the predetermined supply threshold. The user of the feed supplying system may be able to perform a further procedure (e.g., to move the movable carrier 8 away from the platform 21) after being notified by the full-load notification. For example, the notifying device 26 is a speaker used to output the full-load notification in a form of sound, or a display used to display the full-load notification in a form of one or more of text, graphic, video, animation, etc. In some embodiments, when it is determined that the weight of the load on the platform 21 indicated by the weight information is between the predetermined weight and the predetermined supply threshold, the second microcontroller 24 also outputs the start signal to the first microcontroller 121.

In one embodiment, the second microcontroller 24 is configured to output the weight information to the first microcontroller 121 via the second wireless communication module 23. The first microcontroller 121 is configured to determine whether the movable carrier 8 for carrying the feed supplied from the feed bin 10 is currently on the platform 21 under the feed bin 10 based on the weight information, and to control the valve module 11 to open the outlet 101 to start supply of the feed when it is determined that the movable carrier 8 is currently on the platform 21. For example, the first microcontroller 121 determines that the movable carrier 8 is currently on the platform 21 under the feed bin 10 and is able to receive the feed when the weight of the load on the platform 21 indicated by the weight information is substantially equal to the predetermined weight. Then, the first microcontroller 121 is further configured to determine whether an amount of the feed thus supplied has reached the predetermined supply threshold based on the weight information, and to control the valve module 11 to close the outlet 101 to stop the supply of the feed when it is determined that the amount of the feed thus supplied has reached the predetermined supply threshold. In this embodiment, the predetermined supply threshold and the predetermined weight may be set by operating the first operation interface 122 of the feeder 1. In some embodiments, when it is determined that the weight of the load on the platform 21 indicated by the weight information is between the predetermined weight and the predetermined supply threshold, the first microcontroller 121 also controls the valve module 11 to open the outlet 101.

In one embodiment, the first microcontroller 121 is further configured to determine whether the movable carrier 8 is currently on the platform 21 to carry the feed supplied from the feed bin 10 based on the result of measurement of the outside-bin distance. For example, the first microcontroller 121 is configured to determine whether the result of measurement of the outside-bin distance is substantially equal to a predetermined carrier-present distance, and to determine that the movable carrier 8 is currently on the platform 21 and is able to receive the feed when it is determined that the result of measurement of the outside-bin distance is substantially equal to the predetermined carrier-present distance. The predetermined carrier-present distance may be equal to a distance between the distance detector 115 and a bottom surface of the movable carrier 8 in a vertical direction when the movable carrier 8 is empty. The first microcontroller 121 controls the valve module 11 to open the outlet 101 so as to start supply of the feed when it is determined that the movable carrier 8 is currently on the platform 21 and is able to receive the feed. Then, the first microcontroller 121 determines whether the amount of the feed supplied from the feed bin 10 has reached the predetermined supply threshold based on the result of measurement of the outside-bin distance. For example, the first microcontroller 121 determines whether the result of measurement of the outside-bin distance is substantially equal to a predetermined loaded distance, and determines that the amount of the feed supplied from the feed bin 10 has reached the predetermined supply threshold when it is determined that the result of measurement of the outside-bin distance is substantially equal to the predetermined loaded distance. The predetermined loaded distance may be equal to a distance between the distance detector 115 and a surface of feed inside the movable carrier 8 in a vertical direction when the movable carrier 8 is filled with feed. The predetermined carrier-present distance and the predetermined loaded distance may be set by operating the first operation interface 122 of the feeder 1. In some embodiments, when it is determined that the result of measurement of the outside-bin distance is between the predetermined carrier-present distance and the predetermined loaded distance, the first microcontroller 121 also controls the valve module 11 to open the outlet 101.

In one embodiment, the second microcontroller 24 is configured to output the full-load notification to the remote monitoring device 3 via the second wireless communication module 23 for the remote monitoring device 3 to present the full-load notification when it is determined that the amount of the feed supplied from the feed bin 10 has reached the predetermined supply threshold.

In summary, the feed-supplying system according to the disclosure utilizes the feed-surface detector 124 to measure the inside-bin distance, and utilizes the first microcontroller 121 to determine whether an amount of feed currently stored in the feed bin 10 is less than the predetermined shortage threshold or has reached the predetermined filled threshold based on the inside-bin distance, and to output the appropriate shortage or filled notification to the remote monitoring device 3 for presenting the shortage notification when it is determined that the amount of feed stored in the feed bin 10 is less than the predetermined shortage threshold or the filled notification when it is determined that the amount of feed stored in the feed bin 10 has reached the predetermined filled threshold. Moreover, the feed-supplying system according to the disclosure utilizes the weight sensor 22 to sense weight of a load on the platform 21 of the weighing scale 2 for outputting the weight information, utilizes the distance detector 115 to measure the outside-bin distance, and determines whether an amount of feed supplied from the feed bin 10 to the movable carrier 8 has reached the predetermined supply threshold based on the weight information or the outside-bin distance. The valve module 11 is controlled to close the outlet 101 of the feed bin 10 to stop the supply of the feed when it is determined that the amount of feed supplied from the feed bin 10 has reached the predetermined supply threshold. In this way, automation of feed supply can be realized, enhancing efficiency and convenience of feed management.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A feed-supplying system comprising:
   a feeder including a feed bin that has a storage space for storing feed, and an outlet in spatial communication with the storage space, a valve module that is mounted on said feed bin and adjacent to said outlet, and that is configured to open and close said outlet, and a monitoring module that is mounted on a top of said feed bin, and that includes a feed-surface detector that is configured to measure an inside-bin distance between said feed-surface detector and a surface inside said feed bin in a vertical direction, and to output a result of measurement of the inside-bin distance, and a first microcontroller that is electrically connected to said valve module and said feed-surface detector, and that is configured to control said valve module to open said outlet to allow said feeder to supply the feed stored in said feed bin, to communicate with said feed-surface detector to obtain the result of measurement of the inside-bin distance, to determine whether an amount of the feed currently stored in said feed bin is less than a predetermined shortage threshold based on the result of measurement of the inside-bin distance, and to output a shortage notification when it is determined that the amount of the feed currently stored in said feed bin is less than the predetermined shortage threshold; and a weighing scale including a platform that is configured to support the feed supplied from said feed bin and that is under said feed bin, a weight sensor that is mounted on said platform, and that is configured to sense weight of a load on said platform, and to output weight information indicating the weight of the load on said platform, and a second microcontroller that is electrically connected to said weight sensor to obtain the weight information, and that is configured to communicate with said first microcontroller, and to cooperate with said first microcontroller to implement one of a first stop-supplying procedure and a second stop-supplying procedure, wherein, in the first stop-supplying procedure, said second microcontroller is configured to determine whether an amount of the feed supplied from said feed bin has reached a predetermined supply threshold based on the weight information, and to output a stop signal to said first microcontroller when it is determined that the amount of the feed supplied from said feed bin has reached the predetermined supply threshold, and in response to receipt of the stop signal from said second microcontroller, said first microcontroller controls said valve module to close said outlet so as to stop the supply of the feed, wherein, in the second stop-supplying procedure, said second microcontroller is configured to output the weight information to said first microcontroller, and said first microcontroller is configured to determine whether an amount of the feed supplied from said feed bin has reached the predetermined supply threshold based on the weight information, and to control said valve module to close said outlet so as to stop the supply of the feed when it is determined that the amount of the feed supplied from said feed bin has reached the predetermined supply threshold, wherein said second microcontroller is further configured to cooperate with said first microcontroller to implement one of a first start-supplying procedure and a second start-supplying procedure, wherein, in the first start-supplying procedure, said second microcontroller is configured to determine whether a movable carrier for carrying the feed supplied from said feed bin is currently on said platform based on the weight information, and to output a start signal to said first microcontroller when it is determined that the movable carrier is currently on said platform, and in response to receipt of the start signal from said second microcontroller, said first microcontroller controls said valve module to open said outlet so as to start the supply of the feed, wherein, in the second start-supplying procedure, said second microcontroller is configured to output the weight information to said first microcontroller, and said first microcontroller is configured to determine whether the movable carrier for carrying the feed supplied from said feed bin is currently on said platform based on the weight information, and to control said valve module to open said outlet so as to start the supply of the feed when it is determined that the movable carrier is currently on said platform, wherein said feeder further includes a gas valve that is mounted on said feed bin and that is electrically connected to said first microcontroller, wherein said feed bin has an inner surface defining the storage space, wherein said first microcontroller is further configured to control said gas valve to inject gas into said feed bin for cleaning said inner surface of said feed bin, wherein said feeder further includes an infrared camera that is mounted on said feed bin, that is electrically connected to said first microcontroller, and that is configured to capture a real-time image of the storage space of said feed bin and to transmit the real-time image to said first microcontroller, and wherein said first microcontroller is further configured to determine whether there is an object attached to said inner surface of said feed bin based on the real-time image, and to control said gas valve to inject gas into said feed bin for cleaning said inner surface of said feed bin when it is determined that there is an object attached to said inner surface of said feed bin.

2. The feed-supplying system as claimed in claim 1, wherein said first microcontroller is further configured to determine a volume of the feed currently stored in said feed bin by obtaining a product of the result of measurement of the inside-bin distance and a cross-sectional area of the storage space of said feed bin, and subtracting the product from a total volume of said feed bin, and to make the volume of the feed currently stored in said feed bin serve as the amount of the feed currently stored in said feed bin.

3. The feed-supplying system as claimed in claim 1, wherein said first microcontroller is further configured to determine an unoccupied ratio that is a ratio of the result of measurement of the inside-bin distance to a height of the storage space of said feed bin, to determine an occupied ratio by subtracting the unoccupied ratio from one, and to make the occupied ratio serve as the amount of the feed currently stored in said feed bin.

4. The feed-supplying system as claimed in claim 1, wherein said monitoring module further includes an alarm, and said first microcontroller is configured to output the shortage notification by controlling said alarm to output an alarm signal when it is determined that the amount of the feed currently stored in said feed bin is less than the predetermined shortage threshold, and to output a filled notification by controlling said alarm to output the alarm signal when it is determined that the amount of the feed currently stored in said feed bin has reached a predetermined filled threshold.

5. The feed-supplying system as claimed in claim 1, further comprising a remote monitoring device,
  wherein said feeder further includes a wireless communication module electrically connected to said first microcontroller, and said first microcontroller is configured to output the shortage notification to said remote monitoring device via said wireless communication module for said remote monitoring device to present the shortage notification when it is determined that the amount of the feed currently stored in said feed bin is less than the predetermined shortage threshold, and to output a filled notification to said remote monitoring device via said wireless communication module for said remote monitoring device to present the filled notification when it is determined that the amount of the feed currently stored in said feed bin has reached a predetermined filled threshold.

6. The feed-supplying system as claimed in claim 1, wherein:
  said valve module includes a distance detector that is mounted adjacent to said outlet of said feed bin, that is electrically connected to said first microcontroller, and that is configured to measure an outside-bin distance between said distance detector and an object outside said feed bin in the vertical direction, and to output a result of measurement of the outside-bin distance to said first microcontroller; and
  said first microcontroller is further configured to determine whether the amount of the feed supplied from said feed bin has reached the predetermined supply threshold based on the result of measurement of the outside-bin distance.

7. The feed-supplying system as claimed in claim 6, wherein said first microcontroller is further configured to determine whether the result of measurement of the outside-bin distance is substantially equal to a predetermined loaded distance, and to determine that the amount of the feed supplied from said feed bin has reached the predetermined supply threshold when it is determined that the result of measurement of the outside-bin distance is substantially equal to the predetermined loaded distance.

8. The feed-supplying system as claimed in claim 1, wherein:
  said weighing scale further includes a notifying device; and
  said second microcontroller is further configured to control said notifying device to output a full-load notification when it is determined that the amount of the feed supplied from said feed bin has reached the predetermined supply threshold.

9. The feed-supplying system as claimed in claim 1, further comprising a remote monitoring device communicably connected to said weighing scale,
  wherein said weighing scale further includes a wireless communication module electrically connected to said second microcontroller, and said second microcontroller is further configured to output the weight information to said remote monitoring device via said wireless communication module for said remote monitoring device to present the weight information.

10. The feed-supplying system as claimed in claim 1, further comprising a remote monitoring device configured to communicate with said feeder,
  wherein said feeder further includes an infrared camera that is mounted on said feed bin, and that is configured to capture a real-time image of the storage space of said feed bin, and to transmit the real-time image to said remote monitoring device for said remote monitoring device to present the real-time image.

11. The feed-supplying system as claimed in claim 1, wherein:
  said valve module includes an electric control valve that is electrically connected to said first microcontroller, and that is mounted at said outlet; and
  said first microcontroller is configured to control said electric control valve to switch between an open state where said outlet is open for allowing the feed stored in said feed bin to be released and a closed state where said outlet is closed for disallowing the feed stored in said feed bin to be released.

12. The feed-supplying system as claimed in claim 1, further comprising:
  a remote monitoring device configured to communicate with said feeder,
  wherein said feeder further includes a positioning module that is mounted on said feed bin, and that is configured to obtain location information related to a current location of said feeder and to transmit the location information to said remote monitoring device for said remote monitoring device to present the location information.

13. The feed-supplying system as claimed in claim 1, wherein said monitoring module further includes:
  an operation interface that is electrically connected to said first microcontroller, and that is configured to be operated to set parameters to be referred to by said first microcontroller for controlling operation of said monitoring module.

14. The system as claimed in claim 1, wherein said weighing scale further includes:
  an operation interface that is electrically connected to said second microcontroller, and that is configured to be operated to set parameters to be referred to by said second microcontroller for controlling operation of said weighing scale.

15. The system as claimed in claim 1, wherein said first microcontroller is further configured to determine whether the amount of the feed currently stored in said feed bin has reached a predetermined filled threshold based on the result of measurement of the inside-bin distance, and to output a filled notification when it is determined that the amount of the feed currently stored in said feed bin has reached the predetermined filled threshold.

16. A feed-supplying system comprising:
  a feeder including
    a feed bin that has a storage space for storing feed, and an outlet in spatial communication with the storage space,
    a valve module that is mounted on said feed bin and adjacent to said outlet, and that is configured to open and close said outlet, and
    a monitoring module that is mounted on a top of said feed bin, and that includes
      a feed-surface detector that is configured to measure an inside-bin distance between said feed-surface detector and a surface inside said feed bin in a vertical direction, and to output a result of measurement of the inside-bin distance, and a first microcontroller that is electrically connected to said valve module and said feed-surface detector, and that is configured to control said valve module to open said outlet to allow said feeder to supply the feed stored in said feed bin, to communicate with said feed-surface detector to obtain the result of measurement of the inside-bin distance, to determine whether an amount of the feed currently stored in said feed bin is less than a predetermined shortage threshold based on the result of measurement of the inside-bin distance, and to output a shortage notification when it is determined that the amount of the feed currently stored in said feed bin is less than the predetermined shortage threshold; and a weighing scale including a platform that is configured to support the feed supplied from said feed bin and that is under said feed bin, a weight sensor that is mounted on said platform, and that is configured to sense weight of a load on said platform, and to output weight information indicating the weight of the load on said platform, and a second microcontroller that is electrically connected to said weight sensor to obtain the weight information, and that is configured to communicate with said first microcontroller, and to cooperate with said first microcontroller to implement one of a first stop-supplying procedure and a second stop-supplying procedure, wherein, in the first stop-supplying procedure, said second microcontroller is configured to determine whether an amount of the feed supplied from said feed bin has reached a predetermined supply threshold based on the weight information, and to output a stop signal to said first microcontroller when it is determined that the amount of the feed supplied from said feed bin has reached the predetermined supply threshold, and in response to receipt of the stop signal from said second microcontroller, said first microcontroller controls said valve module to close said outlet so as to stop the supply of the feed, wherein, in the second stop-supplying procedure, said second microcontroller is configured to output the weight information to said first microcontroller, and said first microcontroller is configured to determine whether an amount of the feed supplied from said feed bin has reached the predetermined supply threshold based on the weight information, and to control said valve module to close said outlet so as to stop the supply of the feed when it is determined that the amount of the feed supplied from said feed bin has reached the predetermined supply threshold, wherein said valve module includes a distance detector that is mounted adjacent to said outlet of said feed bin, that is electrically connected to said first microcontroller, and that is configured to measure an outside-bin distance between said distance detector and an object outside said feed bin in the vertical direction, and to output a result of measurement of the outside-bin distance to said first microcontroller, wherein said first microcontroller is further configured to determine whether a movable carrier for carrying the feed supplied from said feed bin is currently on said platform based on the result of measurement of the outside-bin distance, and to control said valve module to open said outlet so as to start the supply of the feed when it is determined that the movable carrier is currently on said platform, wherein said first microcontroller is further configured to determine whether the result of measurement of the outside-bin distance is substantially equal to a predetermined carrier-present distance, and to determine that the movable carrier is currently on said platform when it is determined that the result of measurement of the outside-bin distance is substantially equal to the predetermined carrier-present distance, wherein said feeder further includes a gas valve that is mounted on said feed bin and that is electrically connected to said first microcontroller, wherein said feed bin has an inner surface defining the storage space, wherein said first microcontroller is further configured to control said gas valve to inject gas into said feed bin for cleaning said inner surface of said feed bin, wherein said feeder further includes an infrared camera that is mounted on said feed bin, that is electrically connected to said first microcontroller, and that is configured to capture a real-time image of the storage space of said feed bin and to transmit the real-time image to said first microcontroller, and wherein said first microcontroller is further configured to determine whether there is an object attached to said inner surface of said feed bin based on the real-time image, and to control said gas valve to inject gas into said feed bin for cleaning said inner surface of said feed bin when it is determined that there is an object attached to said inner surface of said feed bin.

* * * * *